US008260977B2

(12) United States Patent
Terauchi et al.

(10) Patent No.: US 8,260,977 B2
(45) Date of Patent: Sep. 4, 2012

(54) CEC COMMUNICATIONS DEVICE, AUDIO AND VISUAL DEVICE USING THEREOF, AND CEC COMMUNICATIONS METHOD

(75) Inventors: Yasuharu Terauchi, Kyoto (JP); Hideki Iwata, Kyoto (JP); Futoshi Ushio, Osaka (JP); Yuji Hayashi, Kyoto (JP)

(73) Assignee: Panasonic Corporation, Osaka (JP)

(*) Notice: Subject to any disclaimer, the term of this patent is extended or adjusted under 35 U.S.C. 154(b) by 0 days.

(21) Appl. No.: 12/980,546

(22) Filed: Dec. 29, 2010

(65) Prior Publication Data

US 2011/0099415 A1   Apr. 28, 2011

Related U.S. Application Data

(63) Continuation of application No. PCT/JP2009/003012, filed on Jun. 30, 2009.

(30) Foreign Application Priority Data

Jul. 3, 2008   (JP) ................................. 2008-175104

(51) Int. Cl.
*G06F 3/00*   (2006.01)
*G06F 11/00*   (2006.01)
(52) U.S. Cl. .......................................... 710/15; 714/5.1
(58) Field of Classification Search .................... 710/15; 345/520; 714/5.1
See application file for complete search history.

(56) References Cited

U.S. PATENT DOCUMENTS

| 2008/0126577 | A1* | 5/2008 | Bae et al. ........................... 710/4 |
| 2008/0152023 | A1  | 6/2008 | Yoshida et al. |
| 2009/0074040 | A1* | 3/2009 | Lida et al. ..................... 375/220 |
| 2009/0284536 | A1  | 11/2009 | Yoshida |

FOREIGN PATENT DOCUMENTS

| JP | 08-87458 | 4/1996 |
| JP | 2007-288407 | 11/2007 |
| JP | 2008-035060 | 2/2008 |
| JP | 2008-054300 | 3/2008 |

OTHER PUBLICATIONS

International Search Report for PCT/JP2009/003012, mail date Jul. 28, 2009.

* cited by examiner

*Primary Examiner* — Henry W. H. Tsai
*Assistant Examiner* — Hyun Nam
(74) *Attorney, Agent, or Firm* — Greenblum & Bernstein, P.L.C.

(57) ABSTRACT

The present invention provides a CEC communications device which eliminates a troublesome process to solve the CEC-related communication malfunction when the CEC communications device detects a CEC-related communication malfunction caused by a software malfunction and improves serviceability of the CEC communications by automatically resetting the CEC to execute a CEC communication recovery. In the CEC communications device, when a CEC communications line monitoring unit detects a CEC-related communication malfunction caused by a software malfunction, a CEC control unit determines a reset order of a CEC appliance found on a CEC network, and notifies the CEC resetting unit of a CEC resetting request. The CEC resetting unit resets the CEC of a CEC appliance found on the CEC network via an HDMI line (DDC in FIG. 1) other than the CEC to recover the CEC communications.

11 Claims, 10 Drawing Sheets

CEC COMMUNICATIONS DEVICE, AUDIO AND VISUAL DEVICE USING THEREOF, AND CEC COMMUNICATIONS METHOD

CROSS REFERENCE TO RELATED APPLICATION

This is a continuation application of PCT application No. PCT/JP2009/003012 filed on Jun. 30, 2009, designating the United States of America.

BACKGROUND OF THE INVENTION (1) Field of the Invention

The present invention relates to a Consumer Electronics Control (CEC) communications device executing communications control on the CEC which represents a device control signal and a control protocol defined by the High-Definition Multimedia Interface (HDMI) standard, and an audio and visual device using the CEC communications device.

(2) Description of the Related Art

Recently, the serial communication has been commonly used to operate one device via another device. As an example, the HDMI standard has additionally defined the CEC utilized for mutual control of audio and visual devices, such as a television receiver (TV), a Digital Versatile Disc (DVD) player, and a DVD/Hard Disk Drive (HDD) recorder. The CEC employs single-line bidirectional asynchronous serial communication. Since a CEC line is directly connected to all of the appliances in a network, a malfunction of one appliance is detrimental to the entire network.

Suppose a CEC output terminal of an appliance is fixed to the low level due to a software malfunction. This causes all the communications lines on the entire network to be fixed to the low-level, resulting in a communication breakdown in the entire CEC network.

When detecting a communication malfunction, a typical serial communication involves conducting a communication test while physically disconnecting all of output terminals of the local appliance one by one to recover from the failure (Patent Reference 1: Japanese Unexamined Patent Application Publication No. 08-87458). However, the CEC standard provides no communication recovery capability in the case where a communication malfunction is detected.

It is rather unfortunate that the CEC currently has no counter measure when a communication breakdown occurs due to the software malfunction and the resulting fix of the CEC output terminal to the low level. Thus, the CEC network is left disabled. A possible solution to the problem also faces another challenge: before the CEC network is recovered, the HDMI cables should be re-connected and the CEC reset.

Under present circumstances, there are not many CEC-compliant appliances, which does not cause so much trouble for resetting the CEC by re-connecting the HDMI cables. However, the troubles below can break out in the future.

Each manufacturer of home appliances is promoting a project to encourage CEC-compliant co-operations between home appliances, leading to further introductions of a variety of CEC-compliant appliances to the market. Concurrently, an increase in such appliances will cause more CEC-misbehaving appliances, followed by more CEC-related communication malfunctions. This is very troublesome since every CEC-related communication malfunction requires the HDMI cables of all the appliances on the network to be re-connected.

The present invention is conceived in view of the above problems and has as an object to provide a CEC communications device and an audio and visual device, the CEC communications device which eliminates a troublesome process to solve the CEC-related communication malfunction when the CEC communications device detects a CEC-related communication malfunction caused by a software malfunction and improves serviceability of the CEC communications by automatically resetting the CEC to execute a CEC communication recovery.

SUMMARY OF THE INVENTION

In order to solve the above problems, a CEC communications device according to an aspect of the present invention controls communications employing CEC (i) defined by a HDMI standard, and (ii) managing device-to-device communications control. The CEC communications device includes: a CEC control unit which controls the CEC communications device; a CEC transmitting and receiving unit which transmits and receives a CEC command via a CEC communications line; a reset order determining unit which determines a reset order of appliances; a CEC communications line monitoring unit which monitors the CEC communications line; and a CEC resetting unit which requests another CEC communications device to transmit a reset command via an HDMI connection line other than the CEC, wherein, when the CEC communications line monitoring unit detects a CEC-related communication malfunction, the CEC control unit controls the CEC resetting unit so that the CEC-related communication malfunction is overcome, the control causing the CEC resetting unit to transmit the reset command to another CEC communications device in the order determined by the reset order determining unit via the HDMI connection line other than the CEC.

As described above, the CEC communications device according to the aspect of the present invention to reset the CEC starting from an appliance to be the highest possible cause of the CEC-related communication malfunction, so that the CEC-related communication malfunction can be overcome eliminating the need of resetting an appliance found normal when the entire CEC network is down. Accordingly, the appliance having the normal CEC module can be kept as it used to be before the CEC-related communication malfunction developed. This structure makes possible restoring the CEC network to that seen before detecting the CEC-related communication malfunction more quickly than simultaneously resetting all the appliances upon detecting the CEC-related communication malfunction.

In the CEC communications device according to the aspect of the present invention, when the CEC communications line monitoring unit detects the CEC-related communication malfunction, the reset order determining unit preferably gives a higher resetting priority to a more-frequently-communicating appliance based on the CEC communications history stored in the CEC control unit because the more-frequently-communicating appliance is highly likely a cause of a communication failure, and determines the reset order.

In the CEC communications device according to the aspect of the present invention, when the CEC communications line monitoring unit detects the CEC-related communication malfunction, the reset order determining unit preferably gives a higher resetting priority to a more-recently-communicating appliance based on the CEC communications history stored in the CEC control unit because the more-recently-communicating appliance is highly likely a cause of a communication failure, and determines the reset order, the most recently-communicating appliance being found in the CEC communications history observed when a CEC-related communication is developed.

In order to solve the above problems, an audio and video apparatus according to another aspect of the present invention includes a CEC communications device controlling communications employing CEC (i) defined by an HDMI standard, and (ii) managing device-to-device communications control. The audio and video apparatus includes: a CEC control unit which controls the CEC communications device included in the audio and video apparatus; a CEC transmitting and receiving unit which transmits and receives a CEC command via a CEC communications line; a reset order determining unit which determines a reset order of appliances; a CEC communications line monitoring unit which monitors the CEC communications line; and a CEC resetting unit which requests another CEC-compliant audio and video apparatus to transmit a reset command via an HDMI connection line other than the CEC.

When the CEC communications line monitoring unit detects a CEC-related communication malfunction, the CEC control unit controls the CEC resetting unit so that the CEC-related communication malfunction is overcome, the control causing the CEC resetting unit to transmit the reset command to an other CEC-compliant audio and video apparatus in the order determined by the reset order determining unit via the HDMI connection line other than the CEC.

In the audio and video apparatus according to the other aspect of the present invention, when the CEC communications line monitoring unit detects the CEC-related communication malfunction, the reset order determining unit preferably gives a higher resetting priority to a more-frequently-communicating appliance based on the CEC communications history stored in the CEC control unit because the more-frequently-communicating appliance is highly likely a cause of a communication failure, and determines the reset order.

In the audio and video apparatus according to the other aspect of the present invention, when the CEC communications line monitoring unit detects the CEC-related communication malfunction, the reset order determining unit preferably gives a higher resetting priority to a more-recently-communicating appliance based on the CEC communications history stored in the CEC control unit because the more-recently-communicating appliance is highly likely a cause of a communication failure, and determines the reset order, the most recently-communicating appliance being found in the CEC communications history observed when a CEC-related communication is developed.

It is noted that the present invention may be introduced in another form than the CEC communications device. The present invention may be introduced in a CEC communications method. The constituent features of the CEC communications device according to an implementation of the present invention may be introduced in a form of a program (software) executed on a computer instead of a form of hardware. The present invention may be introduced as a computer-readable storage medium storing such a program, including a CD-ROM.

A CEC communications device automatically can solve a CEC-related communication malfunction once detecting the CEC-related communication malfunction.

Furthermore, the CEC communications device according to an implementation of the present invention refers to a CEC communications history, and resets the CEC starting from an appliance to be the highest possible cause of the CEC-related communications error, so that the CEC-related communications error can be overcome eliminating the need of resetting an appliance found normal when the entire CEC network was down. Accordingly, the appliance having the normal CEC module can be kept as it was before the CEC-related communication error developed. This structure makes possible recovering the CEC network to that before detecting the CEC-related communication error more quickly than simultaneously resetting all the appliances upon detecting the CEC-related communication error.

Further Information About Technical Background To This Application

The disclosure of Japanese Patent Application No. 2008-175104 filed on Jul. 3, 2008 including specification, drawings and claims is incorporated herein by reference in its entirety.

The disclosure of PCT application No. PCT/JP2009/003012 filed on, Jun. 30, 2009, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENTS

Described hereinafter are Embodiments in the present invention, with reference to the drawings.

(Embodiment 1)

Figure 1:
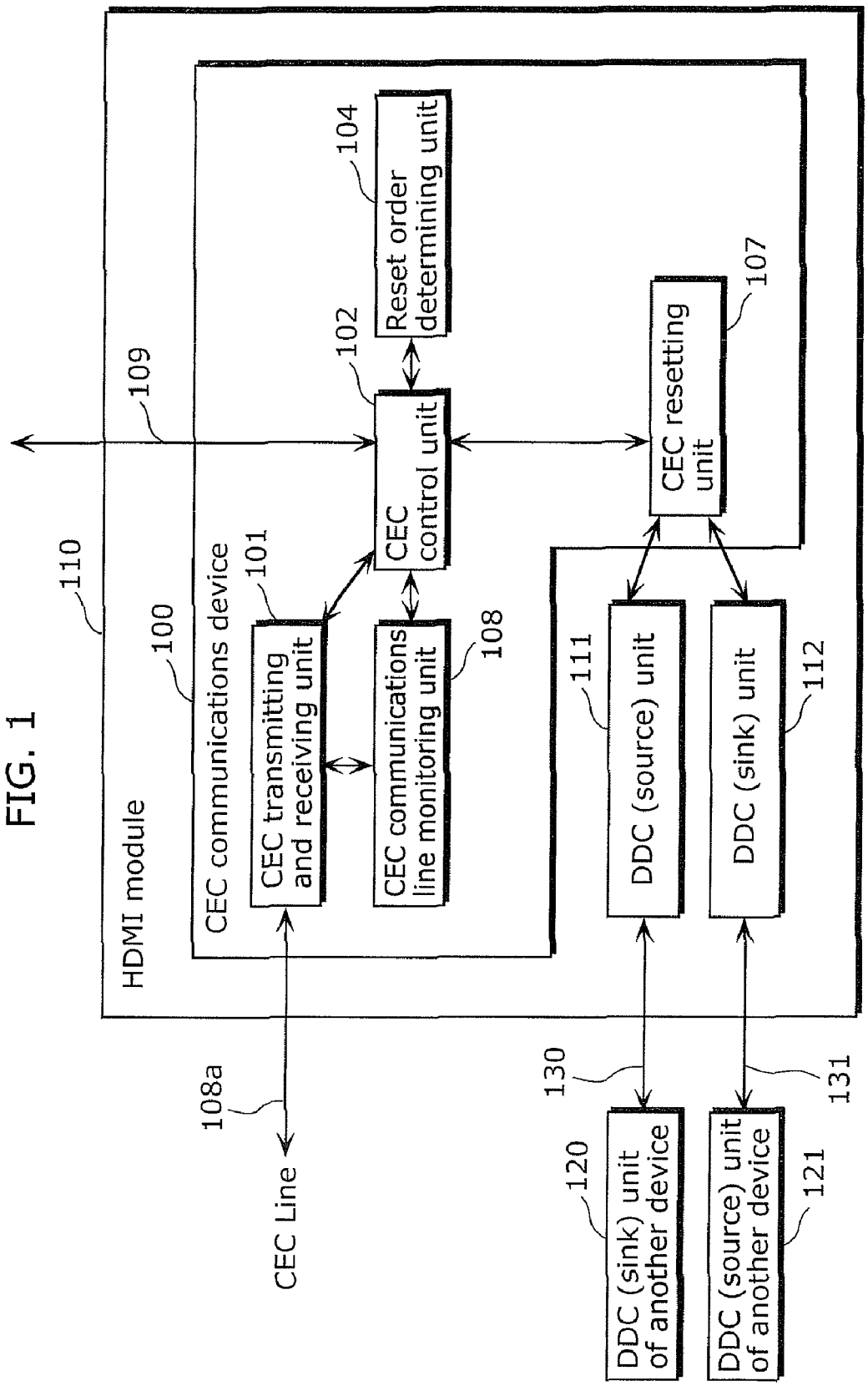
FIG. 1 is a block diagram showing a structure of a CEC communications device according to Embodiment 1 in the present invention.

FIG. 1 is a block diagram showing a structure of a CEC communications device according to Embodiment 1 in the present invention. In Embodiment 1, the DDC is exemplified as an HDMI connection line other than the CEC. The DDC is used for notifying another CEC communications device included in a CEC-compliant appliance, of a reset command transmission request.

Figure 2:
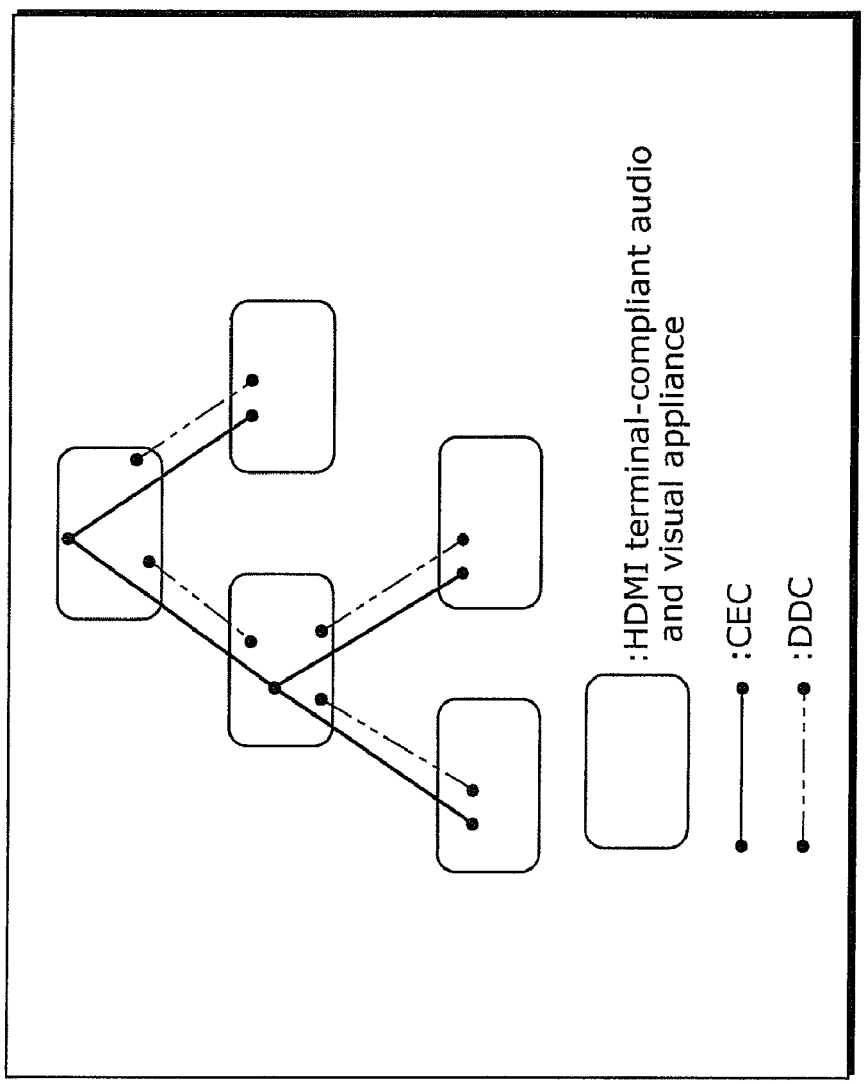
FIG. 2 shows a CEC-and-Display Data Channel (DDC)-based network view.

The DDC is a line used for changing a configuration and a status of a source device and a sink device. FIG. 2 shows a CEC-and-DDC-based network view. The CEC directly connects to all the appliances on the network. The DDC connects only to devices directly connected with the HDMI cable. In a single HDMI terminal-compliant audio and visual device, a DDC line of the source and a DDC line of the sink are not connected.

Figure 3:
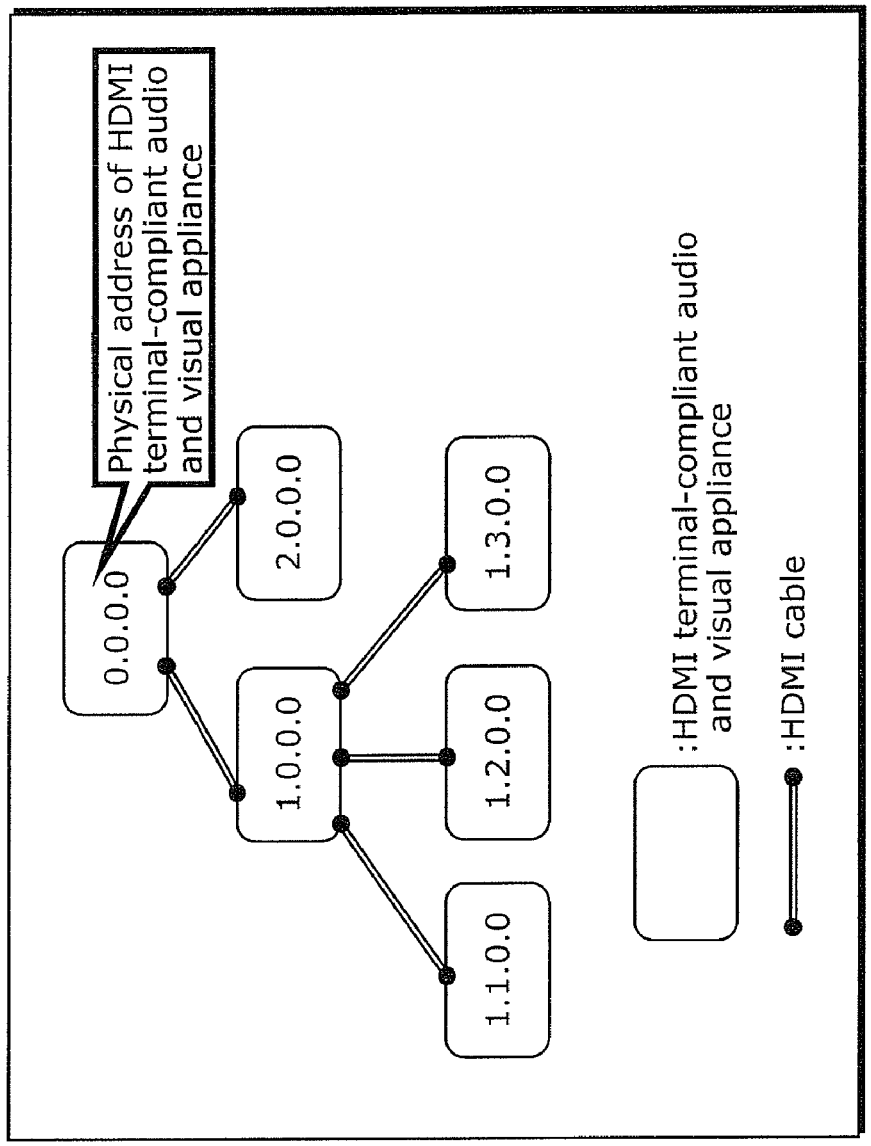
FIG. 3 shows an HDMI network view.

In order to recover from a CEC-related communication malfunction, an HDMI-defined physical address is used. FIG. 3 shows an HDMI network view. The HDMI forms a tree-like network as shown in FIG. 3. A physical address corresponds to a connecting location of a device on the tree, and is expressed in four digits. Any HDMI terminal-compliant audio and visual appliance has the physical address. The physical address is mainly used when information on a physical connection is required. As shown in FIG. 3, the physical address is defined as follows: the physical address of the root device is (0.0.0.0), physical addresses of child devices of the root device are (1.0.0.0), (2.0.0.0) . . . , and physical addresses of child devices of the address (2.0.0.0) are (2.1.0.0), (2.2.0.0) . . . .

As shown in FIG. 1, an HDMI module 110 includes a CEC communications device 100, a DDC (source) unit 111 which is an HDMI connection line instead of the CEC, and a DDC (sink) unit 112. The DDC (source) unit 111 is connected to a DDC (sink) unit 120 of another CEC communications device 100. The DDC (sink) unit 112 is connected to a DDC (source) unit 121 of the other CEC communications device 100. The DDC (source) unit 111 and the DDC (sink) unit 112 are used for changing a configuration and a status of the source device and the sink device.

The CEC communications device 100 controls communications employing the CEC (i) defined by an HDMI standard, and (ii) managing device-to-device communications control The CEC communications device 100 includes a CEC control unit 102 controlling a CEC communications device, a CEC transmitting and receiving unit 101 transmitting and receiving a CEC command, a reset order determining unit 104 determining a reset order of appliances, a CEC communications line monitoring unit 108 monitoring a CEC communications line 108a, and a CEC resetting unit 107 requesting a CEC communications device of another CEC-compliant appliance to transmit a reset command via an HDMI connection line other than the CEC. The CEC communications device 100 has the following feature: when the CEC communications line monitoring unit 108 detects a CEC-related communication malfunction, the CEC resetting unit 107 transmits the reset command to the CEC communications device of the other CEC-compliant appliance. Here, the reset command is transmitted in an order determined by the reset order determining unit 104 via the HDMI connection line other than the CEC. As a result, the CEC communications device 100 recovers from the CEC-related communication malfunction A numerical reference 108a denotes an input and an output of a CEC signal to and from another HDMI terminal-compliant audio and visual appliance. A numerical reference 130 denotes a connection between the DDC (source) unit 111 of the CEC communications device 100 and the DDC (sink) unit 120 of the other device. A numerical reference 131 denotes a connection between the DDC (source) unit 121 of the other device and the DDC (sink) unit 112 of the CEC communications device 100. A numerical reference 109 denotes an input and an output to and from a system control unit 1021 (See FIG. 10).

The CEC communications device 100 prepares for a CEC recovery when getting connected to a CEC network, and executes the CEC recovery upon detecting a CEC-related communication malfunction.

Described first is an operation in connecting to the CEC network.

The system control unit 1021 (See FIG. 10) of an audio and visual device (DVD recorder) including the CEC communications device 100 informs the CEC control unit 102 that the CEC communications device 100 is connecting to the CEC network. When processing the connection to the CEC network, the CEC control unit 102, which has detected the connection, requests the CEC transmitting and receiving unit 101 to transmit a CEC message in order to determine whether or not the CEC communications device is to execute the recovery from the CEC-related communication malfunction. Here, each of the CEC messages determines whether or not a recovery-executing appliance has already been present. Upon receiving the request to transmit the CEC messages determining presence or absence of a recovery-executing appliance on the CEC network, the CEC transmitting and receiving unit 101 transmits the CEC messages to all of the other CEC communications devices found on the CEC network.

In the case where the CEC transmitting and receiving unit 101 does not receive a CEC message indicating a presence of a recovery-executing appliance (indicating the case where no recovery-executing appliance has been present on the CEC network), the CEC communications device 100 works as the recovery-executing appliance (hereinafter referred to as "host").

Described below is an operation of the CEC communications device 100 working as the host. The CEC communications device 100; namely the host, requests the CEC control unit 102 to transmit CEC messages inquiring physical addresses of all the devices on the CEC network in order to obtain all the physical addresses for preparing for a CEC communication recovery. Upon receiving the request to transmit the inquiring CEC messages, the CEC control unit 102 requests the CEC transmitting and receiving unit 101 to transmit the inquiring CEC messages. On receiving the inquiring CEC messages, the CEC transmitting and receiving unit 101 transmits the inquiring CEC messages to all the other devices on the CEC network. When receiving CEC messages notifying of the physical addresses from the other devices, the CEC transmitting and receiving unit 101 notifies the CEC control unit 102 of addresses of the other devices: the physical addresses and logical addresses. Here, a logical address is used for the CEC communications, and included in a CEC message. When receiving the physical addresses and the logical addresses of the other devices, the CEC control unit 102 associates each of the physical address with a corresponding one of the logical addresses, and stores the associated addresses in itself. When a CEC-related communication malfunction is detected, the CEC communications are down. Thus, the logical addresses are unavailable. Since the host uses a physical address to execute a CEC reset instruction on the DDC line, the CEC control unit 102 has to associate the following of all the devices on the CEC network: the logical addresses and the physical addresses associated with the logical addresses with respective CEC-compliant appliances.

Under normal CEC communications, a CEC communications history is obtained from the CEC transmitting and receiving unit 101 and stored in the CEC control unit 102.

Suppose the CEC transmitting and receiving unit 101 receives from another device a CEC message determining presence or absence of a host on the CEC network after the CEC communications device 100 becomes the host. The CEC transmitting and receiving unit 101 notifies the CEC control unit 102 of the reception of the CEC message. Upon receiving the CEC message from the other device, the CEC control unit 102 requests the CEC transmitting and receiving unit 101 to transmit a CEC message notifying the other device that the CEC communications device 100 is the host. Here, the CEC control unit 102 assigns the physical address of the CEC communications device 100 to the notifying CEC message. Once receiving the request to transmit the notifying CEC message, the CEC transmitting and receiving unit 101 transmits the notifying CEC message to the other device.

In the case where the CEC transmitting and receiving unit 101 receives a CEC message indicating a presence of a recovery-executing appliance (indicating the case where a recovery-executing appliance has been present on the CEC network), the CEC communications device 100 is in a wait state of the communication recovery (hereinafter referred to as "slave"). The CEC transmitting and receiving unit 101 (i) notifies the CEC control unit 102 of the physical address, of the host, assigned to the CEC message, and (ii) stores the physical address in the CEC control unit 102.

When the CEC transmitting and receiving unit 101 receives a CEC message sent from another device working as the host and inquiring the physical address of the CEC communications device 100, the CEC transmitting and receiving unit 101 notifies the CEC control unit 102 of reception of the inquiring CEC message. Upon receiving a request to transmit a CEC message notifying the other device working as the host of the physical address of the CEC communications device 100, the CEC control unit 102 transmits the notifying message to the host.

Figure 4:
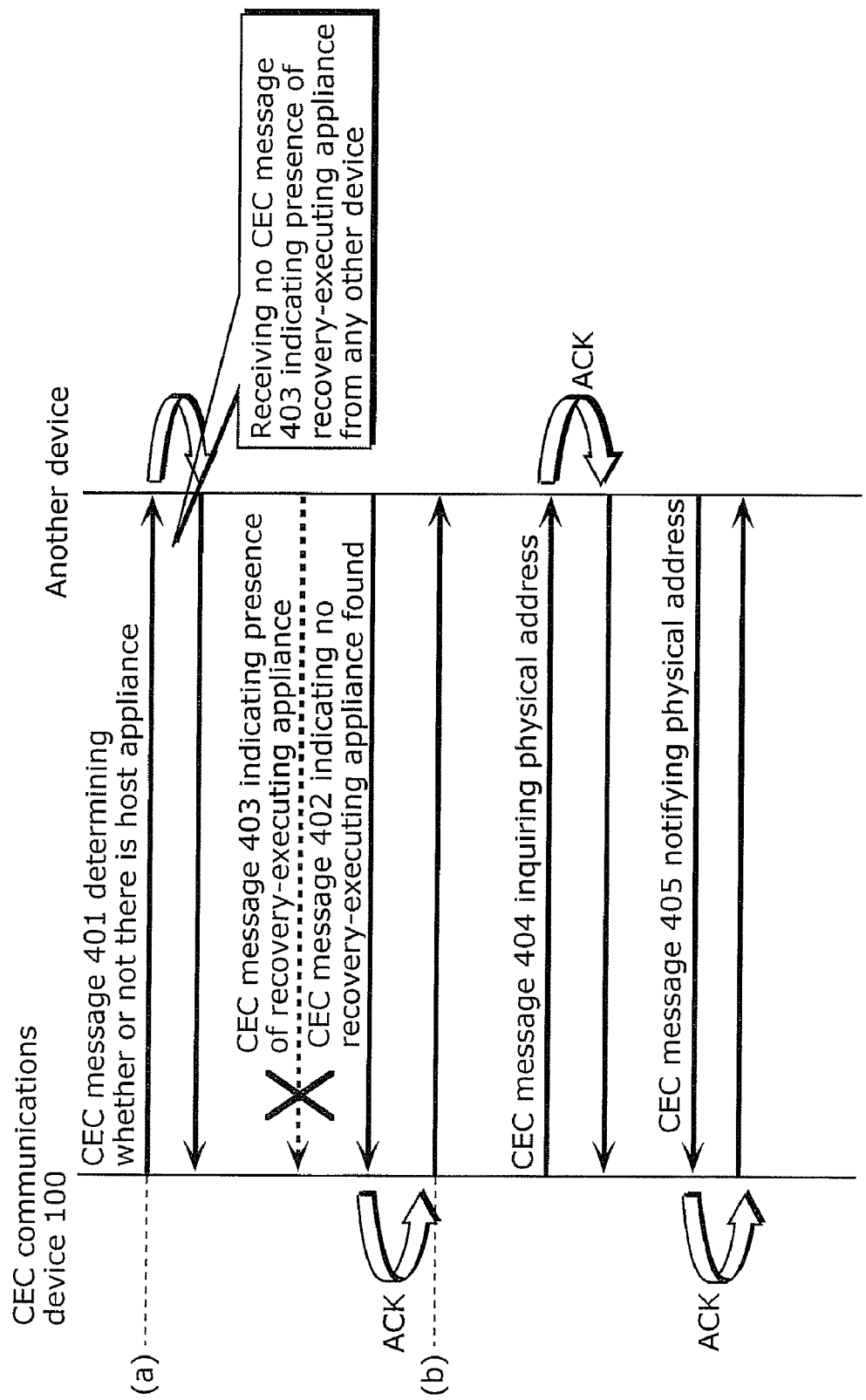
FIG. 4 sequentially shows how (i) a CEC communications device 100 determines whether or not the CEC communications device 100 executes a recovery from a CEC-related communication malfunction, and (ii) the CEC communications device 100 becomes the host.
Figure 5:
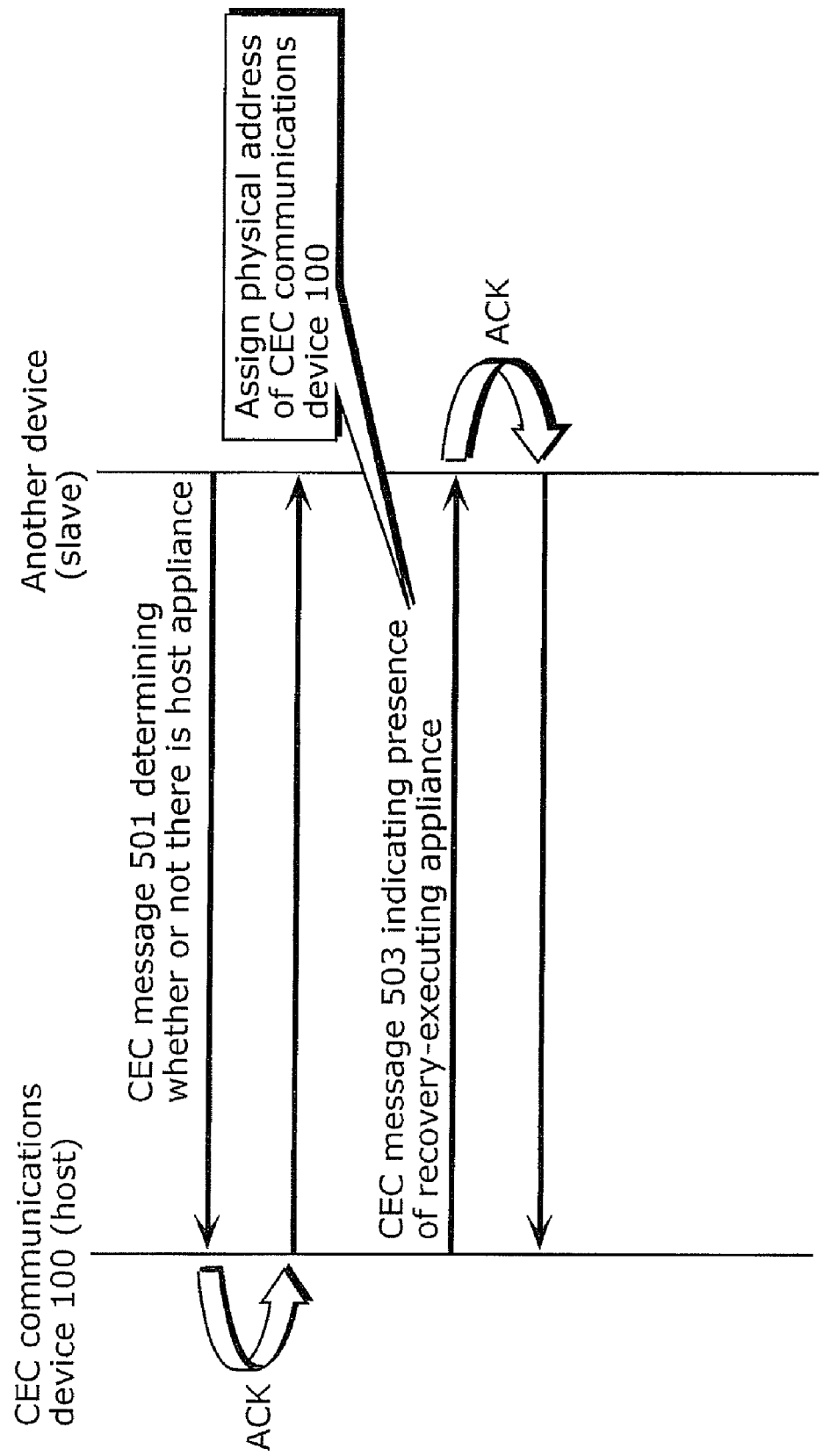
FIG. 5 sequentially shows the case where the CEC communications device, which has become the host, receives from another CEC communications device a CEC message determining whether or not there is another host on the network.

FIGS. 4 and 5 show a flow of an operation when the CEC communications device 100 works as a host in connecting to the CEC network.

FIG. 4 sequentially shows how (i) the CEC communications device 100 determines whether or not the CEC communications device 100 executes a recovery from a CEC-related communication malfunction, and (ii) the CEC communications device 100 becomes a host. When connected to the CEC network, the CEC communications device 100 transmits CEC messages 401 determining whether or not there is a host appliance to all of the other devices on the CEC network. At the point of (a) in FIG. 4, it remains undefined whether or not the CEC communications device 100 is the host or a slave. In the case where the CEC communications device 100 does not receive a CEC message 403 indicating a presence of a recovery-executing appliance (indicating the case where the other device responds to the CEC communications device 100 only with a CEC message 402 indicating no recovery-executing appliance found), the CEC communications device 100 is designated to be the host (at the point (b)). The CEC communications device 100, designated to be the host, transmits CEC messages 404 inquiring physical addresses to all the other devices in order to prepare for CEC recovery. When receiving from another device a CEC message 405 notifying the CEC communications device 100 of the physical address of another device, the CEC communications device 100 associates the physical address with a logical address (the logical addresses is included in the CEC message). The CEC communications device 100 creates a list having the logical addresses associated with the physical addresses of all the devices on the CEC network, and stores the created list in the CEC control unit 102 (See FIG. 1).

FIG. 5 sequentially shows the case where the CEC communications device 100, which has become the host, receives from another CEC communications device a CEC message determining whether or not there is another host on the network. When the CEC communications device 100 receives from another device a CEC message 501 determining whether or not there is the host on the host on CEC network, the CEC communications device 100 transmits in response a CEC message 503 indicating a presence of a recovery-executing appliance. The CEC communications device 100 assigns its physical address information to the CEC message 503 indicating a presence of a recovery-executing appliance, and notifies the other device of the physical address of the CEC communications device 100 working as the host.

Figure 6:
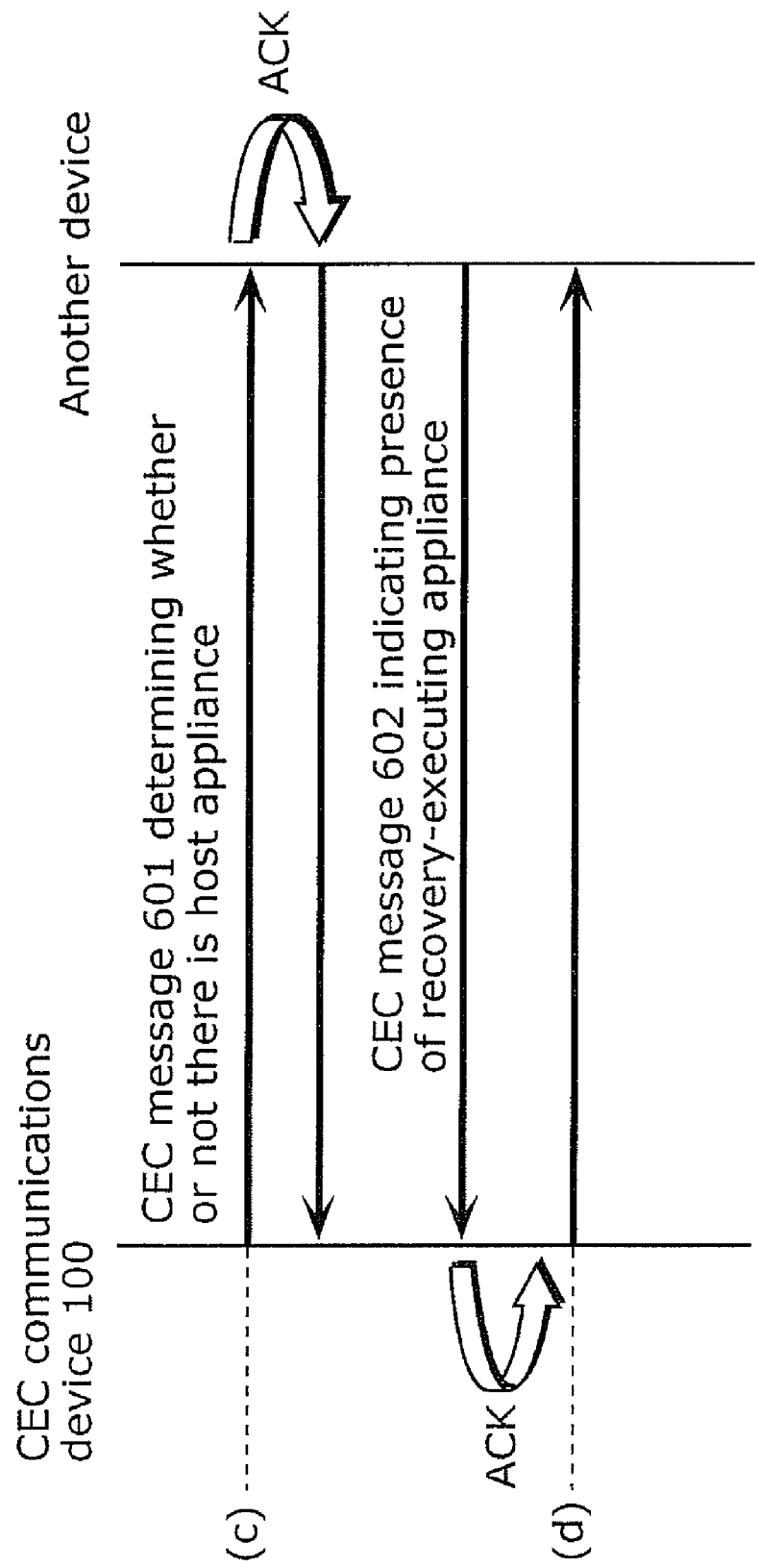
FIG. 6 sequentially shows how (i) the CEC communications device 100 determines whether or not the CEC communications device 100 executes a recovery from a CEC-related communication malfunction, and (ii) the CEC communications device 100 becomes a slave.
Figure 7:
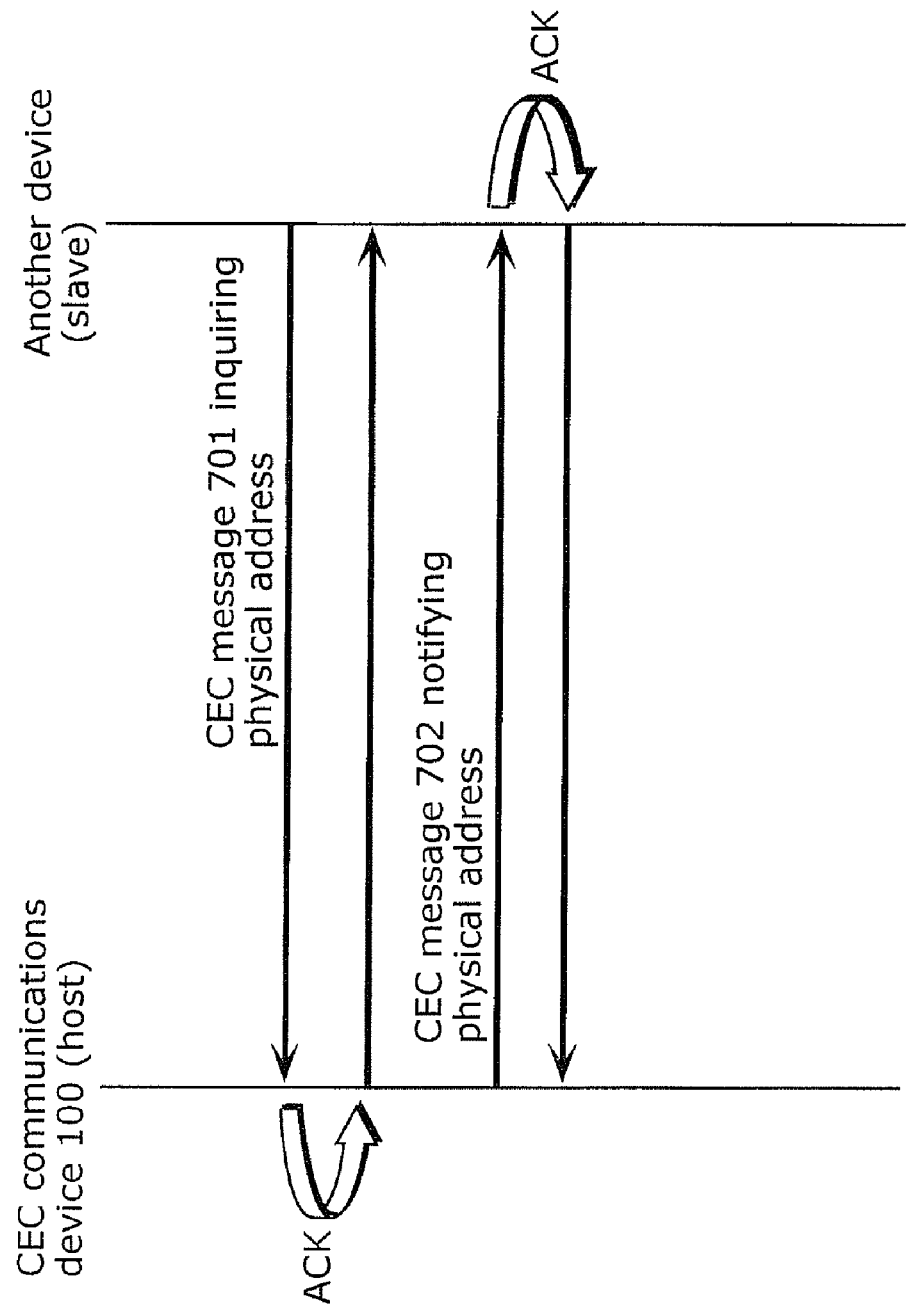
FIG. 7 sequentially shows the case where the CEC communications device 100 which has become the slave receives from another communications device which is the host a CEC message inquiring of the physical address.

FIGS. 6 and 7 show a flow of an operation in the case where the CEC communications device 100 works as a slave when connected to the CEC network.

FIG. 6 sequentially shows how (i) the CEC communications device 100 determines whether or not the CEC communications device 100 executes a recovery from a CEC-related communication malfunction, and (ii) the CEC communications device 100 becomes a slave. When connected to the CEC network, the CEC communications device 100 transmits CEC messages 601 determining whether or not there is a host appliance to all of the other devices on the CEC network. At the point of (c) in FIG. 6, it remains undefined whether or not the CEC communications device 100 is the host or a slave. When receiving a CEC message 602 indicating a presence of a recovery-executing appliance from another device, the CEC communications device 100 is designated to be a slave (at the point (d)).

FIG. 7 sequentially shows the case where the CEC communications device 100; namely the slave, receives from another communications device; namely the host, a CEC message inquiring the physical address of the CEC communications device 100. Upon receiving a CEC message 701 inquiring the physical address from the other device; namely the host, the CEC communications device 100 transmits to the other device; namely the host, a CEC message 702 notifying of the physical address. In other words, the CEC communications device 100 notifies the other device; namely the host, of the physical address of its own.

Described next is an operation of the CEC communications device 100 when the CEC communications line 108a is fixed to Low, and the CEC communications line monitoring unit 108 detects a CEC-related communication malfunction caused by the fix. The operation is described in the following cases: the cases where the CEC communications device 100 is (i) the host, and (ii) a slave.

Described first is an operation in the case where the CEC communications device 100 is the host. When the CEC communications line monitoring unit 108 detects, thorough the CEC transmitting and receiving unit 101, a CEC-related communication malfunction developed because an output of the CEC communications line 108a has been fixed to Low, the CEC communications line monitoring unit 108 transmits a notification of CEC-related communication malfunction to the CEC control unit 102. Upon receiving the notification, the CEC control unit 102 sends to the reset order determining unit 104 a request for determining a CEC reset order. On receiving the request for determining a CEC reset order, the reset order determining unit 104 obtains a CEC communications history from the CEC control unit 102 to determine a reset order of CEC-compliant appliances. Then, the reset order determining unit 104 notifies the CEC control unit 102 of the determined reset order of the CEC-compliant appliances.

When receiving the determined reset order, the CEC control unit 102 notifies the CEC resetting unit 107 of a physical address. Here, the physical address is of an appliance subject to CEC resetting, and extracted according to the determined reset order of the CEC-compliant appliances. Upon receiving the physical address of the appliance subject to CEC resetting and the physical address of the CEC communications device 100; namely the host, the CEC resetting unit 107 compares the physical address of the appliance subject to CEC resetting with the physical address of the CEC communications device 100 to determine whether or not to notify the DDC (source) unit 111 or the DDC (sink) unit 112 of the physical addresses. Then, the CEC resetting unit 107 notifies the DDC (source) unit 111 or the DDC (sink) unit 112 of a CEC reset instruction and the physical addresses.

When the DDC (source) unit 111 receives from the CEC resetting unit 107 the CEC reset instruction and the physical addresses, the DDC (source) unit 111 notifies the DDC (sink) unit 120 included in the other device; namely a slave, of the CEC reset instruction and the physical addresses.

When the DDC (sink) unit 112 receives from the CEC resetting unit 107 the CEC reset instruction and the physical addresses, the DDC (sink) unit 112 notifies the DDC (source) unit 121 included in the other device; namely the slave, of the CEC reset instruction and the physical addresses.

After transmitting the CEC reset instruction and the physical addresses to the slave device, the CEC communications device 100; namely the host, is in a state waiting for a CEC-resetting-completed notification to be transmitted from the appliance subject to CEC resetting.

Operations of the DDC (source) unit 121 and the DDC (sink) unit 120 of the other device shall be described in "details of an operation in the case where the CEC communications device 100 is a slave". Here, the other device; namely a slave, receives the CEC reset instruction, the physical address of the CEC communications device 100, and the physical address of the appliance subject to CEC resetting.

When the DDC (sink) unit 120 or the DDC (source) unit 121 of the other device; namely a slave, notifies the DDC (source) unit 111 or the DDC (sink) unit 112 of the CEC-resetting-completed notification, the DDC (source) unit 111 or the DDC (sink) unit 112 transmits the CEC-resetting-completed notification to the CEC resetting unit 107. Then, the CEC resetting unit 107 transmits the CEC-resetting-completed notification to the CEC control unit 102. Upon receiving the CEC-resetting-completed notification, the CEC control unit 102 requests the CEC communications line monitoring unit 108 to monitor a CEC communications line. The CEC communications line monitoring unit 108 obtains information on a status of the CEC communications line from the CEC transmitting and receiving unit 101. The CEC communications line monitoring unit 108 notifies the CEC control unit 102 of the information on the status of the CEC communications line. When the status of the CEC communications line is "High", the CEC control unit 102 determines that the CEC-related communication malfunction has been overcome, and then ends the CEC recovery. When the condition of the CEC communications line is "Low", the CEC control unit 102 determines that the CEC-related communication malfunction has not been overcome yet. Then, according to the order determined by the reset order determining unit 104, the CEC control unit 102 resets the CEC module of the device to be secondarily CEC-reset. The CEC control unit 102 continues the resetting according to the order determined by the reset order determining unit 104 until (i) the CEC communications line 108a recovers or (ii) all the devices on the CEC communications line 108a are CEC-reset.

Described next is an operation in the case where the CEC communications device 100 is a slave. Suppose the physical address of the appliance subject to CEC resetting and the CEC reset instruction are transmitted either (i) from the DDC (sink) unit 120 of the other device to the DDC (source) unit 111 or (ii) from the DDC (source) unit 121 of the other device to the DDC (sink) unit 112. The DDC (source) unit 111 or the DDC (sink) unit 112 whichever received the transmission notifies the CEC resetting unit 107 of (i) the CEC reset instruction, (ii) the physical address of the CEC communications device 100 and (iii) the physical address of the appliance subject to CEC resetting. The CEC resetting unit 107 (i) obtains the physical address of the CEC communications device 100 from the CEC control unit 102, and (ii) compares the physical address of the appliance subject to CEC resetting with the physical address of the CEC communications device 100. Here, the CEC resetting unit 107 receives the physical address of the appliance subject to CEC resetting in order to determine whether or not the CEC reset is executed to the physical address of the CEC communications device 100.

In the case where the physical addresses correspond each other (the case where the physical address of the CEC communications device 100 is subject to the CEC resetting), the CEC resetting unit 107 notifies the CEC control unit 102 of a CEC module resetting instruction. Upon executing the CEC module resetting, the CEC control unit 102 notifies the CEC resetting unit 107 of (i) a CEC-resetting-completed transmission request, and (ii) the physical address of the host appliance. When receiving the CEC-resetting-completed transmission request and the physical address of the host appliance, the CEC resetting unit 107 refers to the physical address of the host appliance, and determines whether or not to notify the DDC (source) unit 111 or the DDC (sink) unit 112 of the CEC-resetting-completed notification. Then, the CEC resetting unit 107 transmits the CEC-resetting-completed notification accordingly.

Suppose the case where the physical addresses do not correspond to each other (the case where the physical address of the CEC communications device 100 is not subject to the CEC resetting). The CEC resetting unit 107 (i) compares the physical addresses, (ii) determines whether or not to notify the DDC (source) unit 111 or the DDC (sink) unit 112 of the CEC reset instruction and the physical address of the appliance subject to CEC resetting, and (iii) accordingly notifies the DDC (source) unit 111 or the DDC (sink) unit 112 of the CEC reset instruction and the physical address of the appliance subject to CEC resetting.

Described below is the case where the CEC communications device 100 is a slave and the CEC-resetting-completed notification is transmitted (i) from the DDC (sink) unit 120 of the other device to the DDC (source) unit 111, or (ii) from the DDC (source) unit 121 to the DDC (sink) unit 112. The DDC (source) unit 111 or the DDC (sink) unit 112 notifies the CEC resetting unit 107 of the CEC-resetting-completed notification. In order to send the CEC-resetting-completed notification to the host appliance, the CEC resetting unit 107 (i) obtains from the CEC control unit 102 the physical addresses of the CEC communications device 100 and the host appliance, (ii) compares the physical addresses to determine whether or not to notify the DDC (source) unit 111 or the DDC (sink) unit 112 of the CEC-resetting-completed notification, and (iii) accordingly notifies the CEC-resetting-completed notification to the DDC (source) unit 111 or the DDC (sink) unit 112.

Described next is an operation of the CEC communications device 100 in detecting the CEC-related communication malfunction with reference to FIGS. 8 and 9.

Figure 9:
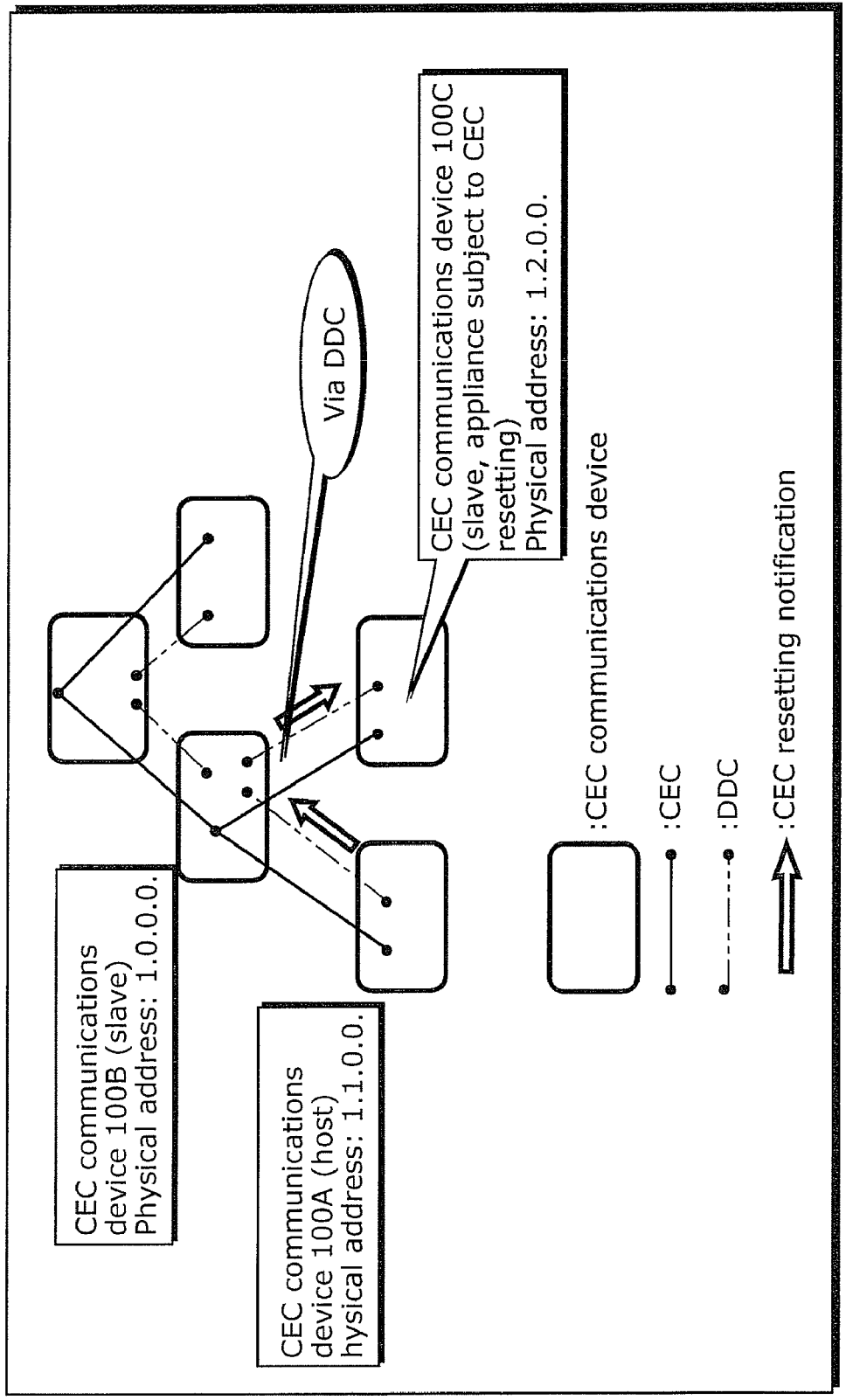
FIG. 9 illustrates a physical network view between the CEC communications device 100A; namely the host, the CEC communications device 100B; namely the slave, and the CEC communications device 100C; namely the slave, when a CEC-related communication malfunction is detected.

FIG. 9 illustrates a physical network view between the CEC communications device 100A; namely the host, the CEC communications device 100B; namely a slave, and the CEC communications device 100C; namely a slave, when a CEC-related communication malfunction is detected.

Figure 8:
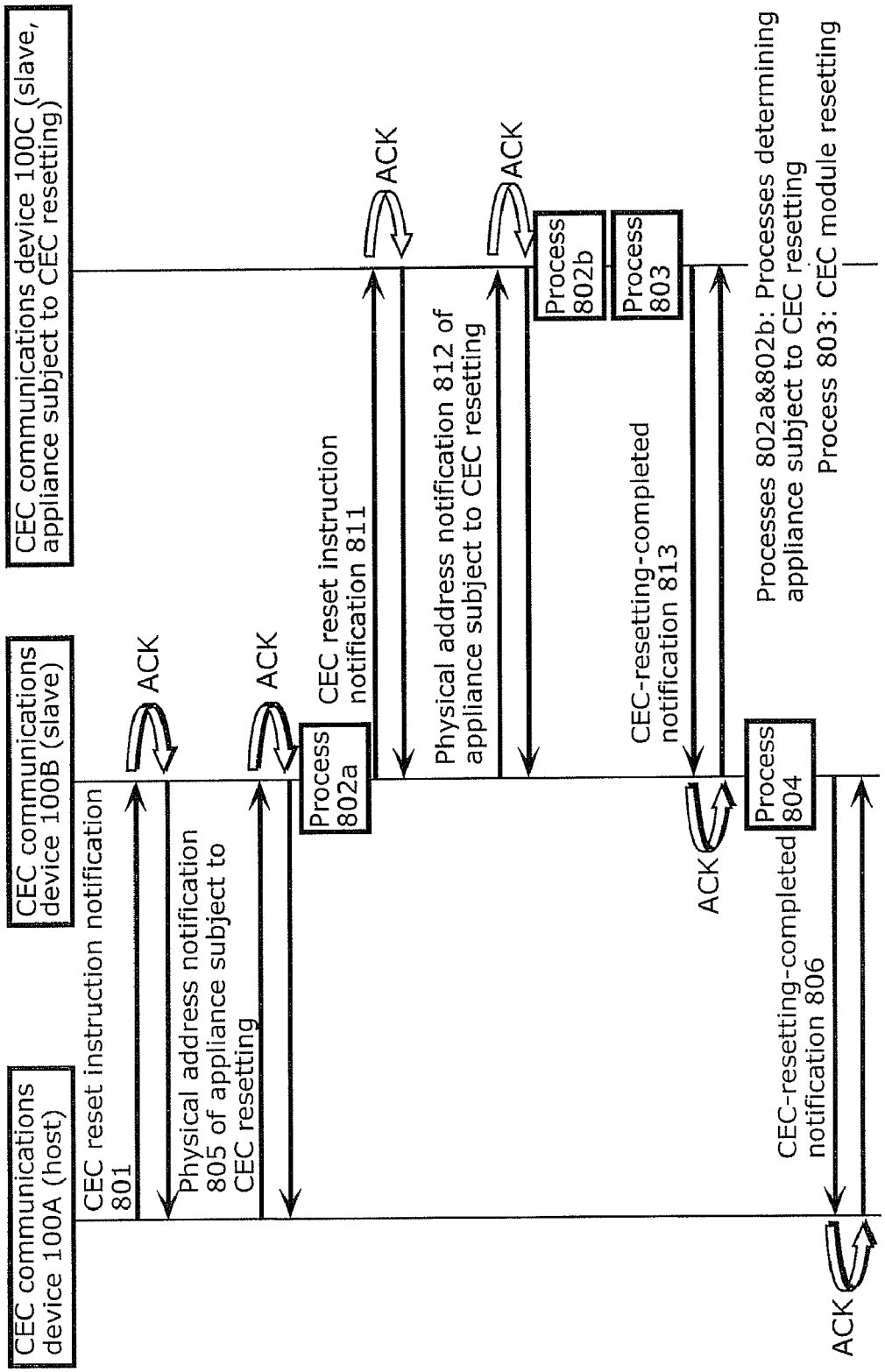
FIG. 8 sequentially shows how a CEC communications device 100A; namely the host, notifies a CEC communications device 100C; namely a slave, of a CEC reset instruction via a CEC communications device 100B; namely a slave, in order to reset the CEC when a CEC-related communication malfunction is detected.

FIG. 8 sequentially shows how a CEC communications device 100A; namely the host, notifies a CEC communications device 100C; namely a slave, of a CEC reset instruction via a CEC communications device 100B; namely a slave, in order to reset the CEC when a CEC-related communication malfunction is detected. The CEC communications device 100B; namely a slave, is not subject to CEC resetting. The CEC communications device 100C; namely a slave, is subject to CEC resetting. The CEC communications device 100A, the CEC communications device 100B, and the CEC communications device 100C are the same as the CEC communications device 100 in FIG. 1 in structure.

The CEC communications device 100A; namely the host, (i) transmits a CEC reset instruction notification 801 to the CEC communications device 100B; namely a slave, and (ii) receives in return an ACK of the CEC reset instruction notification 801. Then, the CEC communications device 100A transmits to the CEC communications device 100B; namely a slave, a physical address notification 805 of the appliance subject to CEC resetting according to the reset order, of the CEC-compliant appliances, determined by the reset order determining unit 104 of the CEC communications device 100A.

After receiving (i) the CEC reset instruction notification 801 and (ii) the physical address notification 805 of the appliance subject to CEC resetting, the CEC communications device 100B; namely a slave, compares the received physical address of the appliance subject to CEC resetting with the physical address of the CEC communications device 100B in order to determine that the CEC reset instruction should be provided to which appliance on the CEC network. As a result of the comparison, the CEC communications device 100B (i) regards itself not to be subject to CEC resetting, and (ii) determines that an appliance subject to CEC resetting is connected to the sink of the CEC communications device 100B (Process 802a). The CEC communications device 100B (i) transmits a CEC reset instruction notification 811 to the CEC communications device 100C connected to the sink, and (ii) notifies the CEC communications device 100C of a physical address notification 812 of the appliance subject to CEC resetting.

Upon receiving the CEC reset instruction notification 811 and the physical address notification 812 of the appliance subject to CEC resetting, the CEC communications device 100C compares the physical address of the received appliance subject to CEC resetting with the physical address of the CEC communications device 100C in order to determine that the CEC reset instruction should be provided to which appliance on the CEC network. The CEC communications device 100C regards itself as the appliance subject to CEC resetting (Process 802b), and resets the CEC module of its own (Process 803). Once executing Process 803, the CEC communications device 100C notifies the CEC communications device 100A; namely the host, of the CEC-resetting-completed notification via the CEC communications device 100B. The CEC communications device 100C notifies the CEC communications device 100B of a CEC-resetting-completed notification 813.

Upon receiving the CEC-resetting-completed notification 813, the CEC communications device 100B compares the physical address of the CEC communications device 100B with the physical address of the host. As a result of the comparison, the CEC communications device 100B regards itself not as the host, and determines that the host is connected to the source of the CEC communications device 100B (Process 804). Then, the CEC communications device 100B notifies the CEC communications device 100A, connected to the source, of a CEC-resetting-completed notification 806.

The CEC communications device 100A; namely the host, receives the CEC-resetting-completed notification 806, and checks a status of the CEC communications line. When the status of the CEC communications line is "High", the CEC communications device 100A regards the status as the recovery from the CEC-related communication malfunction, and finishes the CEC recovery process. When the status is "Low", the CEC communications device 100A determines that the CEC-related communication malfunction has not been overcome yet, and resets the CEC of the second device to be CEC-reset according to the order determined by the reset order determining unit 104.

As described above, the CEC communications device 100 according to Embodiment 1 involves the following: when the CEC communications line monitoring unit 108 detects a CEC-related communication malfunction caused by a software malfunction, the CEC control unit 102 determines the reset order of CEC devices found on the CEC network, and notifies the CEC resetting unit 107 of a CEC resetting request. The CEC resetting unit 107 resets the CEC of a CEC device on the CEC network via the HDMI line (DDC in FIG. 1) other than the CEC to recover the CEC communications. Hence, the CEC communications device 100 automatically solves the CEC-related communication malfunction once detecting the CEC-related communication malfunction.

It is noted that the more-frequently-communicating appliance is highly likely a cause of a communication failure. Thus, the reset order determining unit 104 may give a higher CEC resetting priority to such an appliance to determine the CEC-reset order.

In the CEC communications device 100, specifically, the following operations may be executed: (i) the CEC control unit 102 may store the transmission and reception executed by the CEC transmitting and receiving unit 101 as a CEC communications history; (ii) when the CEC communications line monitoring unit 108 detects a CEC-related communication malfunction, the reset order determining unit 104 may give a higher resetting priority to the more-frequently-communicating appliance based on the CEC communications history stored in the CEC control unit 102 because such an appliance can highly likely a cause of a communication failure, and (iii) when the CEC communications line monitoring unit 108 detects the CEC-related communication malfunction, the CEC resetting unit 107 may transmit a reset command to the CEC communications device of the other CEC-compliant appliance in the order determined by the reset order determining unit 104 via an HDMI connection line other than the CEC, so that the CEC-related communication malfunction.

In addition, the more-recently-communicating-appliance on the communications history found when a CEC-related malfunction was developed is highly likely another cause of a communication failure. The reset order determining unit 104 may also give a higher CEC resetting priority to such a device to determine the CEC-reset order.

In the CEC communications device 100, specifically, the following operations may be executed: (i) the CEC control unit 102 may store the transmission and reception performed by the CEC transmitting and receiving unit 101 as a CEC communications history; (ii) when the CEC communications line monitoring unit 108 detects a CEC-related communication malfunction, the reset order determining unit 104 may give a higher resetting priority to the more-recently-communicating-appliance based on the CEC communications history stored in the CEC control unit 102 because such an appliance can highly likely a cause of a communication failure, and when the CEC communications line monitoring unit 108 detects the CEC-related communication malfunction, (iii) when the CEC communications line monitoring unit 108 detects the CEC-related communication malfunction, the CEC resetting unit 107 may transmit a reset command to CEC communications devices of the other CEC-compliant appliance in the order determined by the reset order determining unit 104 via an HDMI connection line other than the CEC, so that the CEC-related communication malfunction.

As described above, a CEC communications device according to an implementation of the present invention refers to a CEC communications history, and resets the CEC starting from an appliance to be the highest possible cause of the CEC-related communication malfunction, so that the CEC-related communication malfunction can be overcome eliminating the need of resetting an appliance found normal when the entire CEC network is down. Accordingly, the appliance having the normal CEC module can be kept as it used to be before the CEC-related communication malfunction developed. This structure makes possible restoring the CEC network to that seen before detecting the CEC-related communication malfunction more quickly than simultaneously resetting all the appliances upon detecting the CEC-related communication malfunction.

(Embodiment 2)

Figure 10:
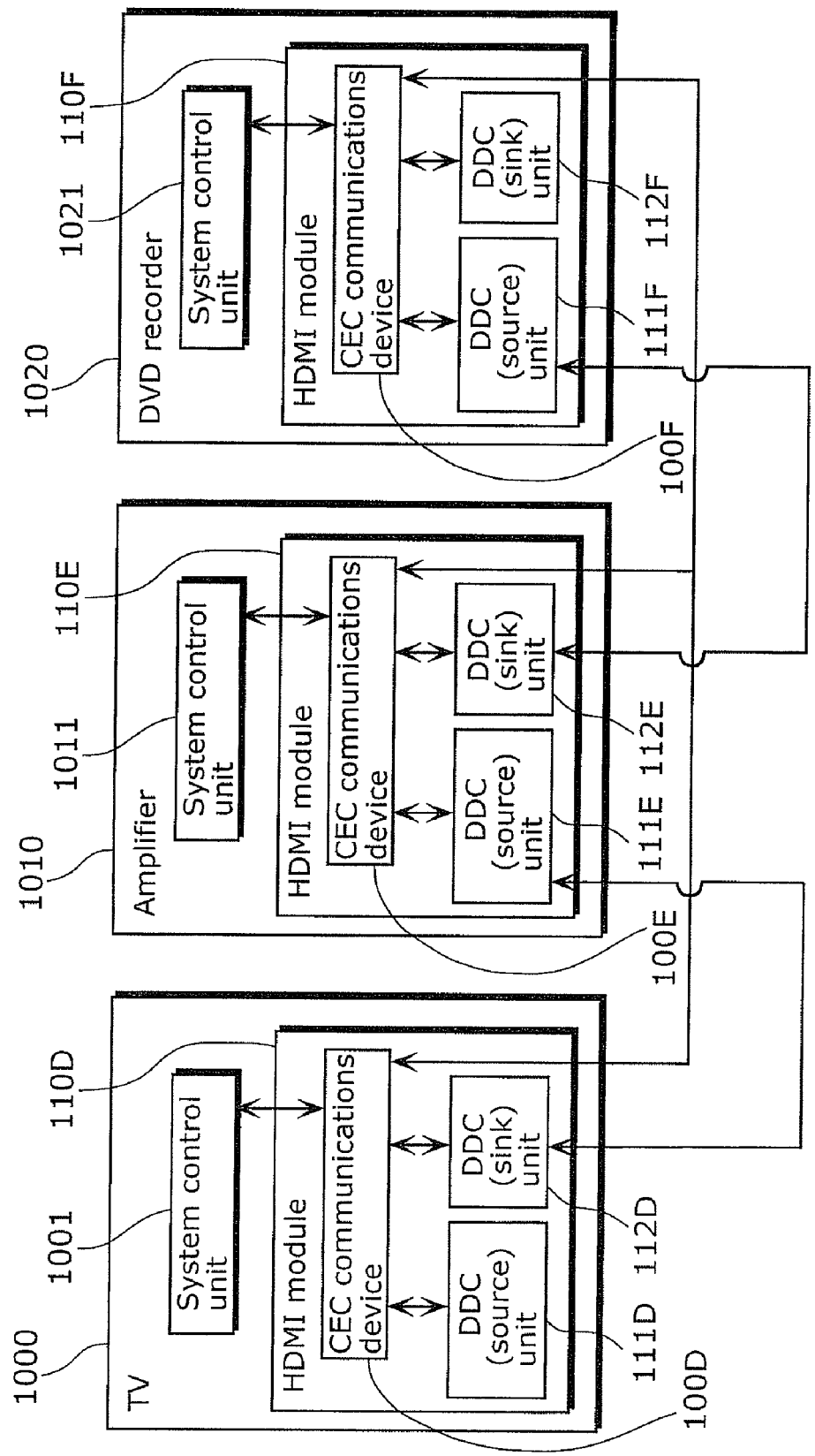
FIG. 10 is a block diagram showing a structure of an audio and visual system according to Embodiment 2 in the present invention.

FIG. 10 is a block diagram showing a structure of an audio and visual system according to Embodiment 2 in the present invention. The audio and visual system has three audio and visual devices (a TV 1000, an amplifier 1010, and a DVD recorder 1020) connected via an HDMI cable.

The TV 1000 includes the following: a system control unit 1001, an HDMI module 110D controlling the HDMI, a CEC communications device 100D, a DDC (sink) unit 112D transmitting and receiving data on the sink of a DDC, and a DDC (source) unit 111D transmitting and receiving data on the source of the DDC. The CEC communications device 100D is the same as the CEC communications device 100 in FIG. 1 in structure.

The amplifier 1010 includes the following: a system control unit 1011, an MDMI module 110E controlling the HDMI, a CEC communications device 100E, a DDC (sink) unit 112E transmitting and receiving data on the sink of the DDC, and a DDC (source) unit 111E transmitting and receiving data on the source of the DDC. The CEC communications device 100E is the same as the CEC communications device 100 in FIG. 1 in structure.

The DVD recorder 1020 includes the following: the system control unit 1021, an HDMI module 110F controlling the HDMI, a CEC communications device 100F, a DDC (sink) unit 112F transmitting and receiving data on the sink of the DDC, and the DDC (source) unit 111F transmitting and receiving data on the source of the DDC. The CEC communications device 100F is the same as the CEC communications device 100 in FIG. 1 in structure.

The audio and visual system prepares for CEC communication recovery when the audio and visual devices 1000, 1010, and 1020 get connected to the CEC network. Upon detecting a CEC-related communication malfunction, the audio and visual system automatically recovers from the CEC-related communication malfunction.

Described first is a preparation for CEC communication recovery when the audio and visual devices 1000, 1010, and 1020 get connected to the CEC network. The preparation for the CEC communication recovery involves determining whether or not the audio and visual devices 1000, 1010, and 1020 will be the host for the CEC communication recovery or a slave waiting for the CEC communication recovery. Which audio and visual device will be the host or a slave depends on the connecting order of the devices on the HDMI cable. In Embodiment 2, the following connection with the HDMI cable is assumed: first, the TV 1000 and the amplifier 1010 are connected, and then, the amplifier 1010 and the DVD recorder 1020 are connected. Embodiment 2 details the case where the TV 1000 is the host. This is because when the TV 1000 and the amplifier 1010 are connected via the HDMI cable, both of the audio and visual devices; namely the TV 1000 and the amplifier 1010, are eligible to be the host since the two remain undefined; that is, the two devices are neither the host nor a slave. A solution to the above problem shall be described later.

Once the TV 1000 and the amplifier 1010 are connected with the HDMI cable, the TV 1000 and the amplifier 1010 detect that they are get connected to the CEC network. In the TV 1000, the system control unit 1001 informs the CEC communications device 100D of the connection to the CEC network. The CEC communications device 100D transmits CEC messages to all of the audio and visual apparatuses (at this point only to amplifier 1010) on the CEC network. Here, each CEC message determines whether or not there is a recovery-executing appliance found on the CEC network. The TV 1000 is designated to be the recovery-executing appliance (the host) in the case where the TV 1000: (i) transmits the determining CEC message before the amplifier 1010 does, and (ii) receives no CEC message indicating a presence of a recovery-executing appliance from any of the audio and visual apparatus (the case where no recovery-executing appliance is found on the CEC network). The TV 1000; namely the host, transmits CEC messages inquiring physical addresses to all the other apparatuses (at this point only to amplifier 1010). When the CEC control unit 102 (See FIG. 1) receiving CEC messages notifying of the physical addresses from the other apparatuses (at this point only to amplifier 1010), the CEC control unit 102 included in the CEC communications device 100D associates each of the physical address with a corresponding one of logical addresses, and stores the associated addresses in itself. Once CEC communication is established, a CEC communications history is stored in the CEC control unit 102 (See FIG. 1) included in the CEC communications device 100D.

When receiving the determining CEC message after the TV 1000 is designated as the host, the CEC control unit 102 transmits a CEC message indicating a presence of a recovery-executing appliance, and having the physical address of the TV 1000 (the host) assigned.

In the amplifier 1010, the system control unit 1011 notifies the amplifier 1010 of the connection to the CEC network. The CEC communications device 100D transmits CEC messages to all of the audio and visual apparatuses (at this point only to the TV 1000) on the CEC network. Here, each CEC message determines whether or not there is a recovery-executing appliance found on the CEC network. Since the TV 1000 has already been the host, the amplifier 1010 receives the CEC message, indicating a presence of a recovery-executing appliance, to be designated as an apparatus waiting for the CEC communication recovery (slave).

The physical address, of the TV 1000, assigned to the CEC message indicating a presence of a recovery-executing appliance is stored in the CEC control unit 102 (See FIG. 1) included in the CEC communications device 100E.

The above operations are carried out in the case where the TV 1000 transmits the determining CEC messages to the CEC network before the amplifier 1010 does. In the case where the amplifier 1010 provides the determining CEC messages to the CEC network before the TV 1000 does, the amplifier 1010 is designated to be the host. Both of the TV 1000 and the amplifier 1010 are eligible to be the host depending on the timing. In this case, either the TV 1000 or the amplifier 1010, when designated as the host, may transmit the determining CEC messages to all the appliances on the network, and if there is another appliance designated as the host other than the TV 1000 or the amplifier 1010, a priority may be set so that an either host (i) the TV 1000 or the amplifier 1010 or (ii) the other appliance is designated to be a slave. An example to set the priority is that (i) the physical addresses of the both hosts are compared, and (ii) the appliance whose physical address is close to the root value (0.0.0.0) is designated as the host.

Furthermore, when the amplifier 1010 and the DVD recorder 1020 are connected with the HDMI cable, the DVD recorder 1020 determines the connection to the CEC network. In the DVD recorder 1020, the system control unit 1021 informs the CEC communications device 100F of the connection to the CEC network. The CEC communications device 100F transmits CEC messages to all of the audio and visual apparatuses (the TV 1000 and the amplifier 1010) on the CEC network. Here, each CEC message determines whether or not there is a recovery-executing appliance found on the CEC network. Since the TV 1000 has already been the host, the amplifier 1010 receives the CEC message indicating a presence of a recovery-executing appliance to be designated as an apparatus waiting for the CEC communication recovery (slave). The physical address, of the TV 1000, assigned to the CEC message indicating a presence of a recovery-executing appliance is stored in the CEC control unit 102 (See FIG. 1) included in the CEC communications device 100F.

Described next is a CEC recovery. Hereinafter detailed is an operation to be executed in the following case: a software malfunction of the DVD recorder 1020 causes the CEC communications line 108*a* to be fixed to Low, and thus a CEC-related communication malfunction develops. As a result, the CEC communications line monitoring unit 108 included in the CEC communications device 100D of the TV 1000 detects the CEC-related communication malfunction.

In the case where the CEC communications line monitoring unit 108 included in the CEC communications device 100D of the TV 1000; namely the host, detects the CEC-related communication malfunction when the CEC communications line 108*a* has been fixed to Low, the reset order determining unit 104 included in the CEC communications device 100D determines the CEC-reset order based on the CEC communications history. Assumed here is that the DVD recorder 1020 is determined to be the first audio and video apparatus to be reset. In order to transmit a CEC reset instruction and the physical address of the appliance subject to CEC resetting, the CEC communications device 100D included in the TV 1000 compares the physical address of the TV 1000 with the physical address of the DVD recorder 1020 subject to CEC resetting. As a result of the comparison, the CEC resetting unit 107 determines that the DVD recorder 1020 subject to CEC resetting is under the DDC (source) unit 111D of the TV 1000. The DDC (sink) unit 112D transmits the CEC reset instruction and the physical address of the appliance subject to CEC resetting to the DDC (source) unit 111E.

Upon receiving from the DDC (source) unit 111E the CEC reset instruction and the physical address of the appliance subject to CEC resetting, the amplifier 1010 compares the received physical address with the physical address of the amplifier 1010 in order to determine that the received CEC reset instruction should be provided to which appliance on the CEC network. As a result of the comparison, the amplifier 1010 (i) regards itself not to be subject to CEC resetting, and (ii) further determines that an appliance subject to CEC resetting is connected to the sink of the CEC communications device 100E. Then, the amplifier 1010 transmits the CEC reset instruction and the physical address of the appliance subject to CEC resetting to the DVD recorder 1020 connected to the sink.

Upon receiving the CEC reset instruction and the physical address, the DVD recorder 1020 compares the received physical address with the physical address of the DVD recorder 1020 in order to determine the CEC reset instruction should be provided to which appliance on the CEC network. The comparison shows that the physical address of the appliance subject to CEC resetting matches with the physical address of the DVD recorder 1020. Thus, the CEC module included in the CEC communications device 100F of the DVD recorder 1020 is reset. Once the CEC module in the CEC communications device 100F is reset, the DVD recorder 1020 transmits a CEC-resetting-completed notification to the TV 1000; namely the host, via the amplifier 1010. Then, the DVD recorder 1020 transmits the CEC-resetting-completed notification from the DDC (source) unit 111F to the DDC (sink) unit 112E.

Upon receiving the CEC-resetting-completed notification from the DDC (sink) unit 112E, the amplifier 1010 compares the physical address of the amplifier 1010 with the physical address of the host. As a result of the comparison, the amplifier 1010 (i) regards itself not as the host, and (ii) further determines that the host is connected to the source of the amplifier 1010. The amplifier 1010 transmits the CEC-resetting-completed notification from the DDC (source) unit 111E to the DDC (sink) unit 112D.

When receiving the CEC-resetting-completed notification from the DDC (sink) unit 112D, the TV 1000 uses the CEC communications line monitoring unit 108 included in the CEC communications device 100D to check the status of the CEC communications line. Resetting the CEC module of the DVD recorder 1020 restores the CEC communications. When the status of the CEC communications line is "High", the CEC-related communication malfunction is regarded to have been overcome, and the CEC recovery process ends. When the status of the CEC communications line is "Low", the CEC-related communication malfunction is regarded not to have been overcome yet. Thus, according to the order determined by the reset order determining unit 104, CEC resetting is executed on an appliance secondarily subject to CEC resetting (the TV 1000 or the amplifier 1010). Once the end of the CEC recovery process is detected or the CEC module of the TV 1000 or the amplifier 1010 is reset, the CEC recovery process ends.

It is noted that the more-frequently-communicating appliance is highly likely a cause of a communication failure. Thus, the reset order determining unit 104 may give a higher CEC resetting priority to such an appliance to determine the CEC-reset order.

Furthermore, the more-recently-communicating-appliance on the communications history found when a CEC communication error was developed is expected to be another chief cause of a communication failure. The reset order determining unit 104 may also give a higher CEC resetting priority to such an appliance to determine the CEC-reset order.

Although only Embodiments 1 and 2 of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

Industrial Applicability

Upon detecting a CEC-related communication malfunction, a CEC communications device according to an implementation of the present invention can automatically recovers from the malfunction. Hence, the present invention is effective in producing a CEC communications control device, such as an audio and video apparatus equipped with a CEC communications device.

What is claimed is:

1. A Consumer Electronics Control (CEC) communications device which controls and manages communications, said CEC communications device comprising:
   a CEC controller configured to control said CEC communications device;
   a CEC transmitter and receiver configured to transmit and receive a CEC command via a CEC communications line;
   a reset order determiner configured to determine a reset order of appliances;
   a CEC communications line monitor configured to monitor the CEC communications line; and
   a CEC resetter configured to request an other CEC communications device to transmit a reset command via a High-Definition Multimedia Interface (HDMI) connection line other than the CEC communications line,
   wherein, when said CEC communications line monitor detects a CEC-related communication malfunction, said CEC controller is configured to control said CEC resetter so that the CEC-related communication malfunction is overcome, the controller causing said CEC resetter to transmit the reset command to the other CEC communications device in accordance with the reset order determined by said reset order determiner via the HDMI connection line other than the CEC communications line.

2. The CEC communications device according to claim 1, wherein, when said CEC controller detects a connection to a CEC network, said CEC controller is configured to:
   determine whether there is a second CEC communications device, on the CEC network, which is configured to solve the CEC-related communication malfunction;
   cause said CEC communications device to solve the CEC-related communication malfunction when there is no second CEC communications device, on the CEC network, which is configured to solve the CEC-related communication malfunction, and when said CEC communications line monitor detects the CEC-related communication malfunction; and
   control said CEC resetter so that the CEC-related communication malfunction is overcome, the control causing said CEC resetter of said CEC communications device which solves the CEC-related communication malfunction to transmit the reset command to the other CEC communications device on the CEC network via the HDMI connection line other than the CEC communications line, the transmission being carried out in the reset order determined by said reset order determiner, and the other CEC communications device waiting for recovery of the CEC-related communication malfunction, and
   said CEC controller determining whether the second CEC communications device is on the CEC network and causing said CEC communications device to solve the CEC-related communication malfunction in order to prepare for a recovery from the CEC-related communication malfunction.

3. The CEC communications device according to claim 1, wherein, when said CEC controller detects a connection to a CEC network, said CEC controller is configured to:
   determine whether there is a second CEC communications device, on the CEC network, which is configured to solve the CEC-related communication malfunction;
   cause said CEC communications device wait for a recovery of the CEC-related communication malfunction when there is the second CEC communications device, on the CEC network, which is configured to solve the CEC-related communication malfunction, and when a second reset command transmitted from the second CEC communications device which is configured to solve the CEC-related communication malfunction is received; and
   reset said CEC communications device, the second reset command being forwarded to said CEC communications device, and
   said CEC controller determining whether the second CEC communications device is on the CEC network and causing said CEC communications device to wait for the recovery of the CEC-related communication malfunction in order to prepare for the recovery from the CEC-related communication malfunction.

4. The CEC communications device according to claim 1, wherein said CEC controller is configured to store, as a CEC communications history, a transmission and a reception executed by said CEC transmitter and receiver,
   when said CEC communications line monitor detects the CEC-related communication malfunction, said reset order determiner is configured to give a higher resetting priority to a most-frequent-communicating appliance based on the CEC communications history stored in said CEC controller, and
   when said CEC communications line monitor detects the CEC-related communication malfunction, said CEC resetter is configured to transmit the reset command to the other CEC communications device in accordance with the reset order determined by said reset order determiner via the HDMI connection line other than the CEC communications line, so that the CEC-related communication malfunction is overcome.

5. The CEC communications device according to claim 1, wherein said CEC controller is configured to store a transmission and a reception executed by said CEC transmitter and receiver as a CEC communications history,
   when said CEC communications line monitor detects the CEC-related communication malfunction, said reset order determiner is configured to give a higher resetting priority to a most-recent-communicating appliance based on the CEC communications history stored in said CEC controller, the most-recent-communicating appliance being found in the CEC communications history, and when said CEC communications line monitor detects the CEC-related communication malfunction, said CEC resetter is configured to transmit the reset command to the other CEC communications device in accordance with the reset order determined by said reset order determiner via the HDMI connection line other than the CEC communications line, so that the CEC-related communication malfunction is overcome.

6. An audio and video apparatus which includes a Consumer Electronic Control (CEC) communications device controlling and managing communications, said audio and video apparatus comprising:
   a CEC controller configured to control the CEC communications device included in said audio and video apparatus;
   a CEC transmitter and receiver configured to transmit and receive a CEC command via a CEC communications line;
   a reset order determiner configured to determine a reset order of appliances;
   a CEC communications line monitor configured to monitor the CEC communications line; and
   a CEC resetter configured to request an other CEC-compliant audio and video apparatus to transmit a reset command via a High-Definition Multimedia Interface (HDMI) connection line other than the CEC communications line,
   wherein, when said CEC communications line monitor detects a CEC-related communication malfunction, said CEC controller is configured to control said CEC resetter so that the CEC-related communication malfunction is overcome, the control causing said CEC resetter to transmit the reset command to the other CEC-compliant audio and video apparatus in accordance with the reset order determined by said reset order determiner via the HDMI connection line other than the CEC communications line.

7. The audio and video apparatus according to claim 6, wherein, when said CEC controller detects a connection to a CEC network, said CEC controller is configured to:
   determine whether there is an other audio and video apparatus, on the CEC network, which is configured to solve the CEC-related communication malfunction;
   cause said audio and video apparatus to solve the CEC-related communication malfunction when there is no other audio and video apparatus, on the CEC network, which is configured to solve the CEC-related communication malfunction, and when said CEC communications line monitor detects the CEC-related communication malfunction; and
   control said CEC resetter so that the CEC-related communication malfunction is overcome, the control causing said CEC resetter of the CEC communications device included in said audio and video apparatus which solves the CEC-related communication malfunction to transmit the reset command to the other CEC-compliant audio and video apparatus on the CEC network via the HDMI connection line other than the CEC communications line, the transmission being carried out in the reset order determined by said reset order determiner, and the other CEC-compliant audio and video apparatus waiting for recovery of the CEC-related communication malfunction, and said CEC controller determining whether the other audio and video apparatus is on the CEC network and causing said audio and video apparatus to solve the CEC-related communication malfunction in order to prepare for a recovery from the CEC-related communication malfunction.

8. The audio and video apparatus according to claim 6, wherein, when said CEC controller detects a connection to a CEC network, said CEC controller is configured to:
   determine whether there is an other audio and video apparatus, on the CEC network, which is configured to solve the CEC-related communication malfunction;
   cause said audio and video apparatus to wait for a recovery of the CEC-related communication malfunction when there is the other audio and video apparatus, on the CEC network, which is configured to solve the CEC-related communication malfunction, and when a second reset command transmitted from the other audio and video apparatus which is configured to solve the CEC-related communication malfunction is received; and
   reset said audio and video apparatus,
the second reset command being forwarded to said audio and video apparatus, and
said CEC controller determining whether the other audio and video apparatus is on the CEC network and causing said audio and video apparatus to wait for the recovery of the CEC-related communication malfunction in order to prepare for the recovery from the CEC-related communication malfunction.

9. The audio and video apparatus according to claim 6, wherein said CEC controller is configured to store, as a CEC communications history, a transmission and a reception executed by said CEC transmitter and receiver,
when said CEC communications line monitor detects the CEC-related communication malfunction, said reset order determiner is configured to give a higher resetting priority to a most-frequent-communicating appliance based on the CEC communications history stored in said CEC controller, and
when said CEC communications line monitor detects the CEC-related communication malfunction, said CEC resetter is configured to transmit the reset command to the other CEC-compliant audio and video apparatus in accordance with the reset order determined by said reset order determiner via the HDMI connection line other than the CEC communications line, so that the CEC-related communication malfunction is overcome.

10. The audio and video apparatus according to claim 6, wherein said CEC controller is configured to store, as a CEC communications history, a transmission and a reception executed by said CEC transmitter and receiver,
when said CEC communications line monitor detects the CEC-related communication malfunction, said reset order determiner is configured to give a higher resetting priority to a most-recent-communicating appliance based on the CEC communications history stored in said CEC controller, the most-recent-communicating appliance being found in the CEC communications history, and
when said CEC communications line monitor detects the CEC-related communication malfunction, said CEC resetter is configured to transmit the reset command to the other CEC-compliant audio and video apparatus in accordance with the reset order determined by said reset order determiner via the HDMI connection line other than the CEC communications line, so that the CEC-related communication malfunction is overcome.

11. A communications method employing Consumer Electronic Control (CEC), said CEC communications method comprising:

controlling a CEC communications device;

transmitting and receiving a CEC command via a CEC communications line;

determining a reset order of appliances;

monitoring the CEC communications line; and requesting an other CEC communications device to transmit a reset command via a High-Definition Multimedia Interface (HDMI) connection line other than the CEC communications line, wherein, when a CEC-related communication malfunction is monitored on the CEC communications line, a CEC resetter of the CEC communications device is controlled so that the CEC-related malfunction is overcome, the CEC resetter of the CEC communications device being controlled to transmit the reset command to the other CEC communications device in accordance with the reset order via the HDMI connection line other than the CEC communications line.

* * * * *